(12) United States Patent
Ball et al.

(10) Patent No.: US 12,157,618 B2
(45) Date of Patent: *Dec. 3, 2024

(54) OPTICAL SIGHTING DEVICE PACKAGING

(71) Applicant: Crimson Trace Corporation, Columbia, MO (US)

(72) Inventors: Shane Ball, Columbia, MO (US); Trevor Payne, Columbia, MO (US); William A. Planck, Columbia, MO (US); Tim Meissen, Columbia, MO (US); Michael Cottrell, Ashland, MO (US); James Tayon, Moberly, MO (US); Ryan Donahue, Columbia, MO (US); Curtis Smith, Columbia, MO (US)

(73) Assignee: Crimson Trace Corporation, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,165

(22) Filed: Apr. 26, 2022

(65) Prior Publication Data

US 2022/0340348 A1    Oct. 27, 2022

Related U.S. Application Data

(60) Provisional application No. 63/179,801, filed on Apr. 26, 2021.

(51) Int. Cl.
| | |
|---|---|
| *B65D 77/26* | (2006.01) |
| *B65D 77/20* | (2006.01) |
| *B65D 85/38* | (2006.01) |
| *G02B 23/16* | (2006.01) |

(52) U.S. Cl.
CPC .............. *B65D 77/26* (2013.01); *B65D 77/20* (2013.01); *B65D 85/38* (2013.01); *G02B 23/16* (2013.01)

(58) Field of Classification Search
CPC ........ B65D 77/26; B65D 77/20; B65D 85/38; G02B 23/16
USPC ........ 206/316.1, 5, 736, 756, 317, 238, 733, 206/732, 735, 734, 730, 305, 1.5; 224/908, 909, 912, 913
See application file for complete search history.

(56) References Cited

U.S. PATENT DOCUMENTS

| | | | |
|---|---|---|---|
| 2,599,689 A | 6/1952 | Brelsford | |
| 3,880,283 A * | 4/1975 | Flaherty | B65D 11/10 206/316.1 |
| D242,022 S | 10/1976 | Bish et al. | |
| 3,986,659 A * | 10/1976 | Vajtay | B65D 15/08 229/125.17 |
| 4,662,107 A | 5/1987 | Van Den Kieboom | |
| D330,512 S | 10/1992 | Ryberg | |

(Continued)

*Primary Examiner* — Rafael A Ortiz
(74) *Attorney, Agent, or Firm* — Stinson LLP

(57) ABSTRACT

Packaging for an optical sighting device and associated components and methods. The optical sighting device has a sighting axis along which a user looks to use the optical sighting device. The packaging comprises a package defining an interior sized and shaped to fit the optical sighting device. The package includes a base comprising an optical sighting device mount to which the optical sighting device is connected. A cover is connected to the base and at least partially bounds the interior. The cover is configured to permit the user to view the optical sighting device through the cover and to look through the sight along the sighting axis.

21 Claims, 18 Drawing Sheets

(56) References Cited

U.S. PATENT DOCUMENTS

| | | | |
|---|---|---|---|
| 6,016,919 A | 1/2000 | Smith et al. | |
| 6,047,833 A * | 4/2000 | Salomon | B65D 25/10 |
| | | | 206/769 |
| 6,208,461 B1 * | 3/2001 | Gaber | G02B 23/12 |
| | | | 359/399 |
| 6,463,697 B2 | 10/2002 | Weder et al. | |
| 6,681,512 B2 | 1/2004 | Sammut | |
| D518,291 S | 4/2006 | Zou et al. | |
| D556,566 S | 12/2007 | Steele, IV et al. | |
| D572,581 S | 7/2008 | Steele, IV et al. | |
| 7,581,671 B2 * | 9/2009 | Erdie | B65D 59/06 |
| | | | 229/5.5 |
| 7,681,755 B2 * | 3/2010 | Roesler | B65D 43/021 |
| | | | 292/303 |
| D681,444 S | 5/2013 | Oja et al. | |
| 8,607,986 B2 | 12/2013 | Lipinski | |
| 8,607,987 B2 | 12/2013 | Oja et al. | |
| D696,936 S | 1/2014 | Radau et al. | |
| D704,549 S | 5/2014 | Liu | |
| D731,211 S | 6/2015 | Denby et al. | |
| 9,334,086 B2 * | 5/2016 | Bean | B65D 25/54 |
| 9,846,009 B1 | 12/2017 | McDaniels | |
| 10,240,899 B2 | 3/2019 | McDaniels | |
| 10,345,077 B1 | 7/2019 | Loebig et al. | |
| 10,345,587 B1 | 7/2019 | Loebig et al. | |
| 2005/0145535 A1 * | 7/2005 | Augborne | B65D 15/08 |
| | | | 206/769 |
| 2006/0032765 A1 | 2/2006 | Morhard et al. | |
| 2006/0283733 A1 | 12/2006 | Masa | |
| 2007/0125672 A1 | 6/2007 | Epling | |
| 2008/0296310 A1 | 12/2008 | Steele, IV et al. | |
| 2011/0049156 A1 * | 3/2011 | Long, Jr. | B65D 85/38 |
| | | | 220/326 |
| 2014/0197056 A1 | 7/2014 | Schilling et al. | |
| 2016/0069641 A1 * | 3/2016 | Kortemeier | F41G 1/383 |
| | | | 206/316.1 |
| 2018/0023921 A1 * | 1/2018 | Chavez | F41G 1/345 |
| | | | 42/113 |
| 2019/0105572 A1 * | 4/2019 | Bell | G06F 1/163 |

\* cited by examiner

OPTICAL SIGHTING DEVICE PACKAGING

CROSS-REFERENCE TO RELATED APPLICATION

The present application claims priority to U.S. Provisional Patent App. No. 63/179,801, filed Apr. 26, 2021, which is hereby incorporated by reference in its entirety.

FIELD

The present disclosure generally relates to product packaging, and more particularly to product packaging for an optical sighting device.

BACKGROUND

Optical sighting devices, such weapon sights, binoculars, range finders, and cameras, are used for various purposes. Such products may be packaged for sale to consumers. A retail store commonly includes a counter storing samples of unpackaged products for consumers to inspect with the assistance of a store employee behind the counter. For example, a consumer may ask the employee to retrieve a certain product sample from the counter and permit the consumer to hold and test the product. When the user is finished, the product is returned to the counter by the employee. If the consumer decides to buy the product, the employee may give the consumer a packaged version of the product to carry to the store checkout counter.

SUMMARY

In one aspect, packaging for an optical sighting device having a sighting axis along which a user looks to use the optical sighting device is disclosed. The packaging comprises a package defining an interior sized and shaped to fit the optical sighting device. The package includes a base comprising an optical sighting device mount to which the optical sighting device is connected. A cover is connected to the base and at least partially bounds the interior. The cover is configured to permit the user to view the optical sighting device through the cover and to look through the sight along the sighting axis.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
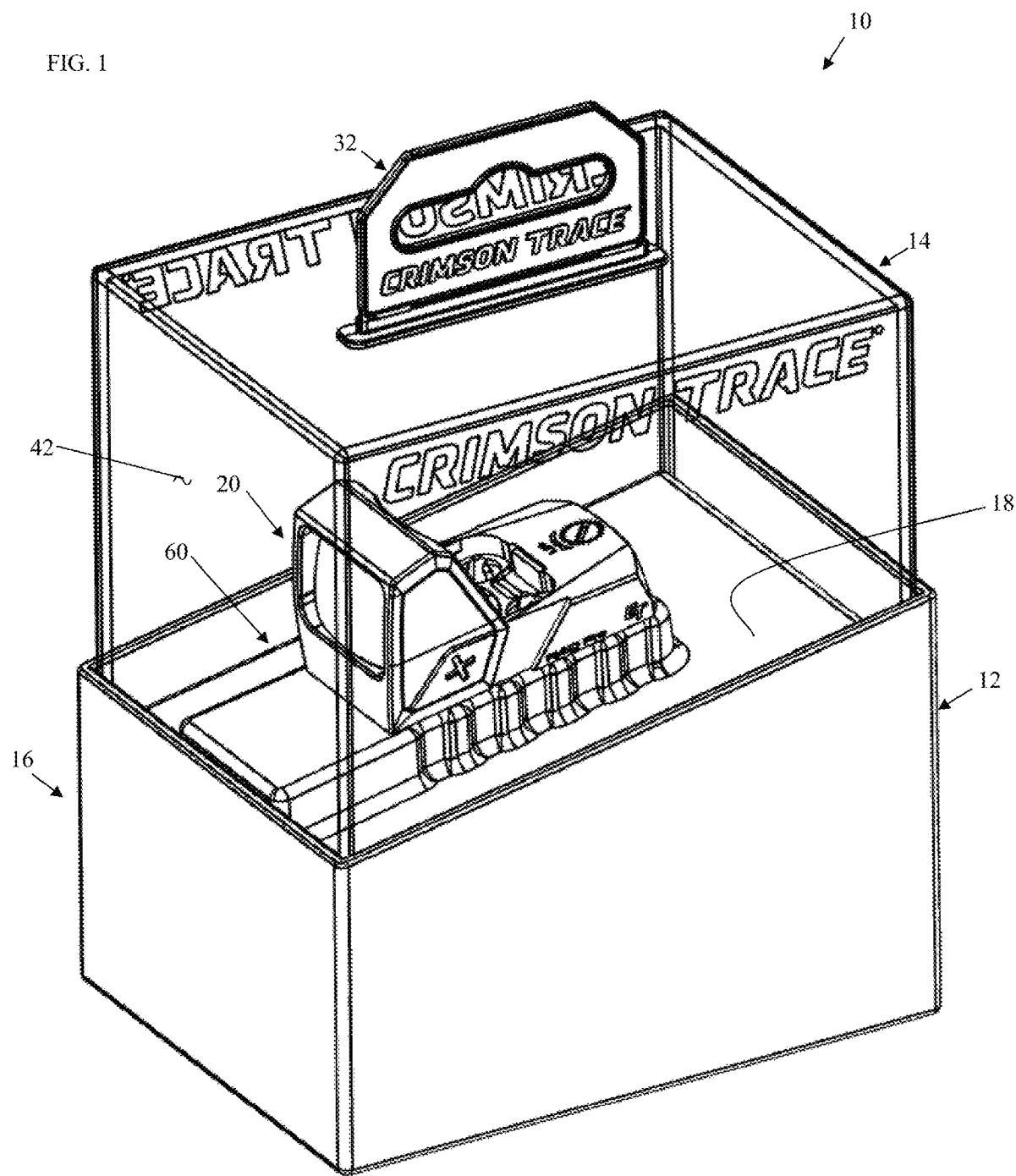
FIG. 1 is a perspective of optical sight packaging and an optical sight.
Figure 2:
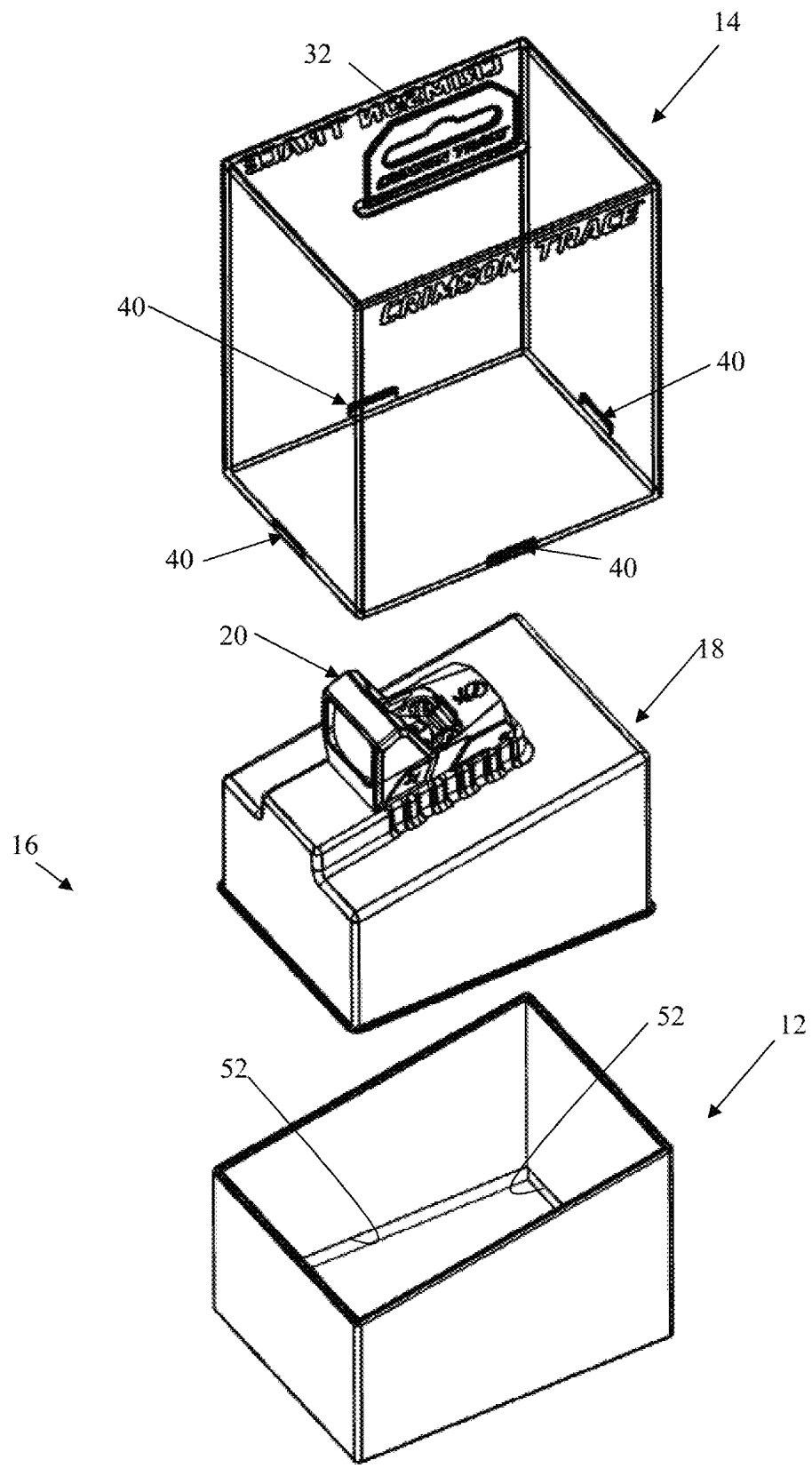
FIG. 2 is an exploded perspective of the optical sight packaging.

Referring to FIGS. 1-7, an optical sighting device packaging of the present disclosure is indicated generally by 10. The optical sighting device (herein referred to as "OSD") 20 shown in FIGS. 1-3 can be referred to as a "red dot" sight (broadly, "weapon sight", and more specifically, "reflector sight"). The sight is shown inside retail packaging (broadly, "product packaging"). The sight includes a reticle to aid a user in sighting a target. It will be understood that the OSD may be a different sighting device (e.g. a rangefinder, camera, binoculars, etc.), with or without a reticle, without departing form the scope of the present disclosure.

In the illustrated embodiment, the retail packaging for the OSD comprises a base 12, a cover 14, an optional hanger 32, and an optional sticker 34 for providing an imitation reticle indicator 36 (broadly, reticle imitation graphic). The base 12 defines a mount/bed 60 for connecting to the OSD. The cover 14 is configured to connect to the base 12 to enclose the OSD but still permit viewing of the OSD through the cover; and to permit viewing down a sight axis SA of the OSD through the cover. It is understood that the OSD has an optical sighting axis SA intended for the user to look down to use the OSD.

In the illustrated embodiment, the base 12 comprises a housing 16 and an insert 18. The housing 16 receives the insert 18, and the insert 18 defines the mount/bed 60. Other configurations (e.g. unitary base) can be used without departing from the scope of this disclosure.

Figure 4:
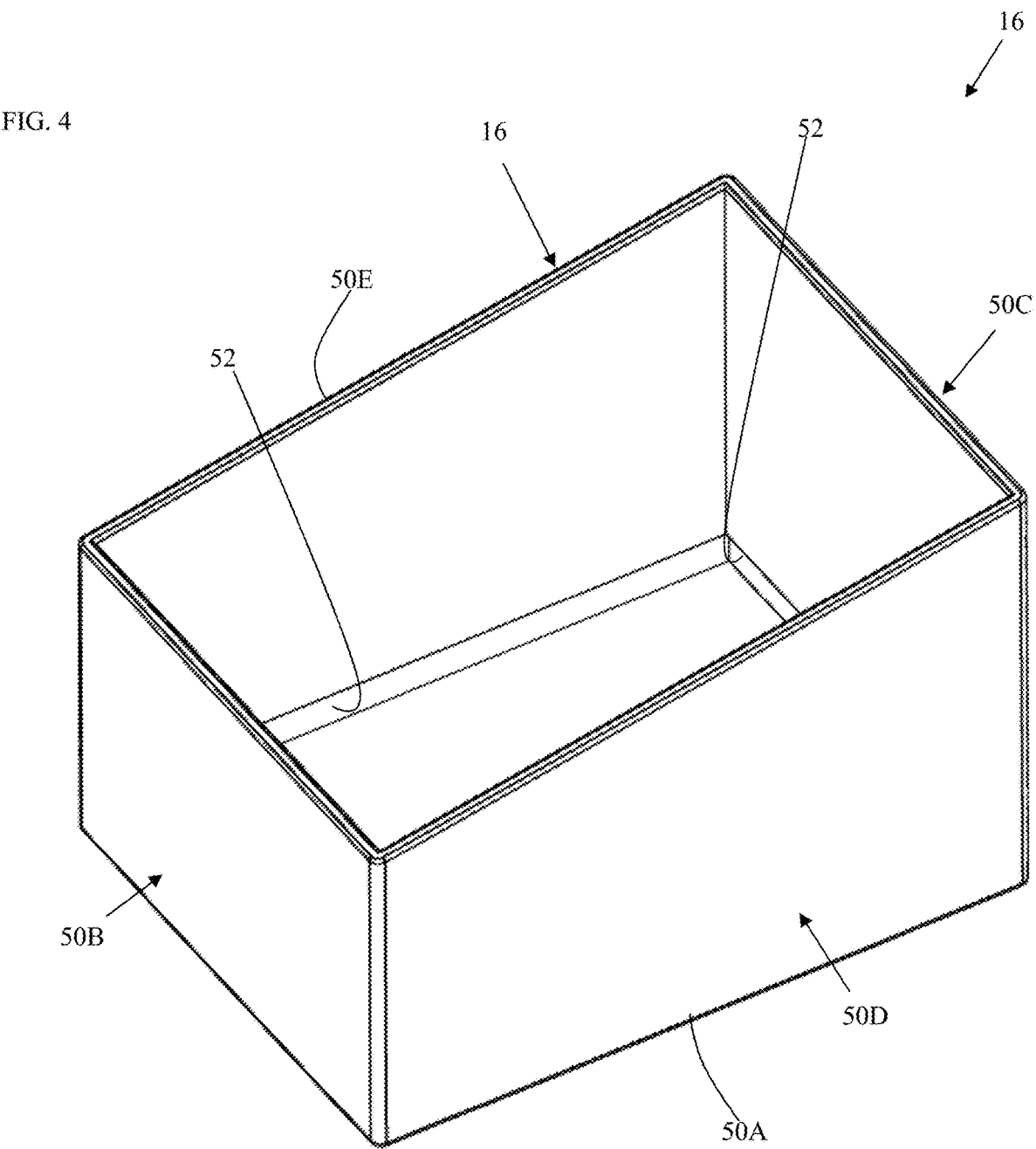
FIG. 4 is a perspective of a base of the optical sight packaging.

Referring now to FIG. 4, the housing 16 includes a bottom wall 50A, a forward wall 50B, a rear wall 50C, a left wall 50D and a right wall 50E. Together the walls form an interior. The interior is sized and shaped for receiving the insert 18. The housing 16 includes housing connectors 52. In the illustrated embodiment, the housing connectors comprise housing openings 54 facing the interior of the housing. The connectors include retaining lips 56 partially bounding the housing openings 54. The function of the housing connectors will be explained in further detail below.

Figure 3:
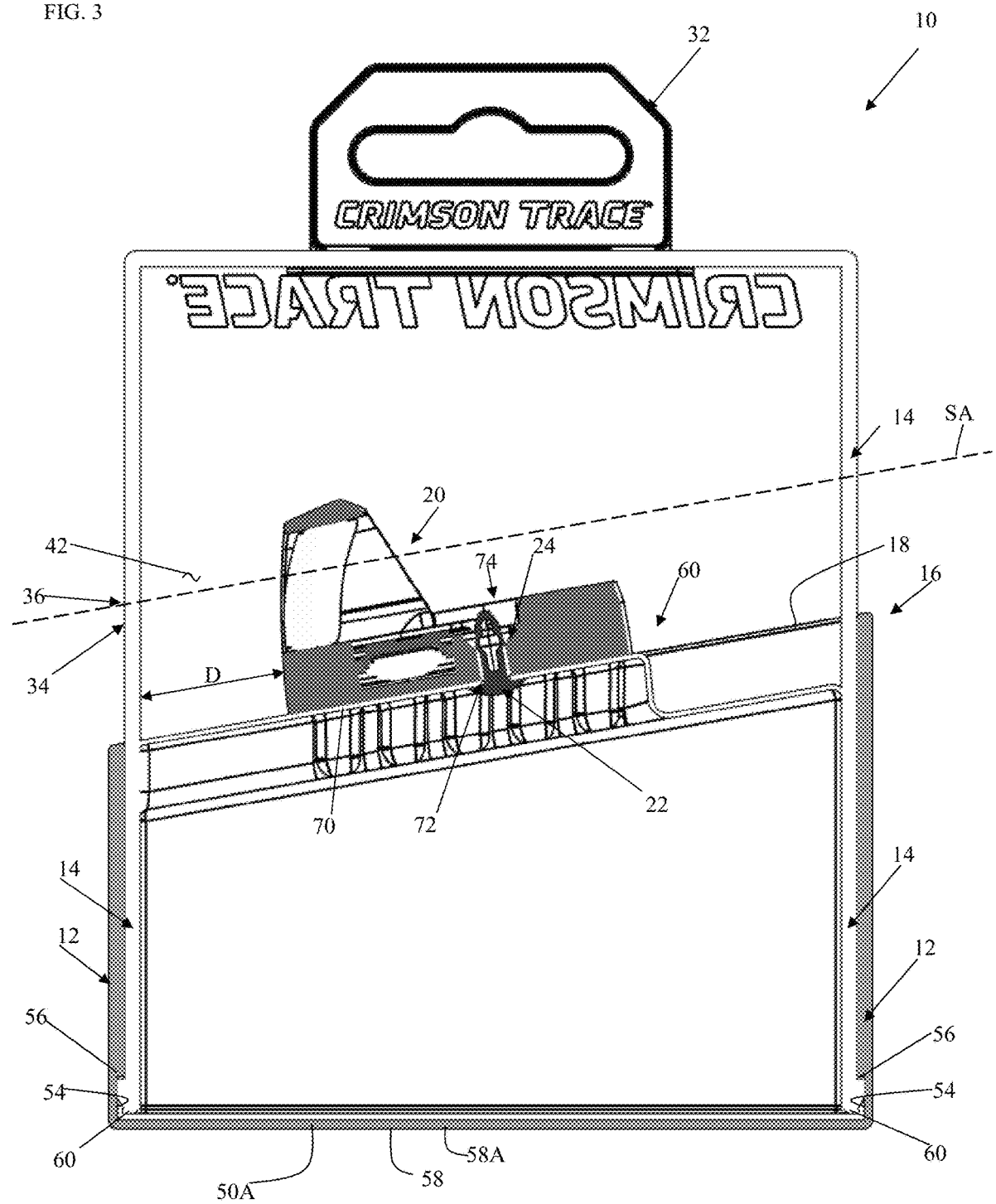
FIG. 3 is a cross-section of the optical sight packaging of FIG. 1.
Figure 5:
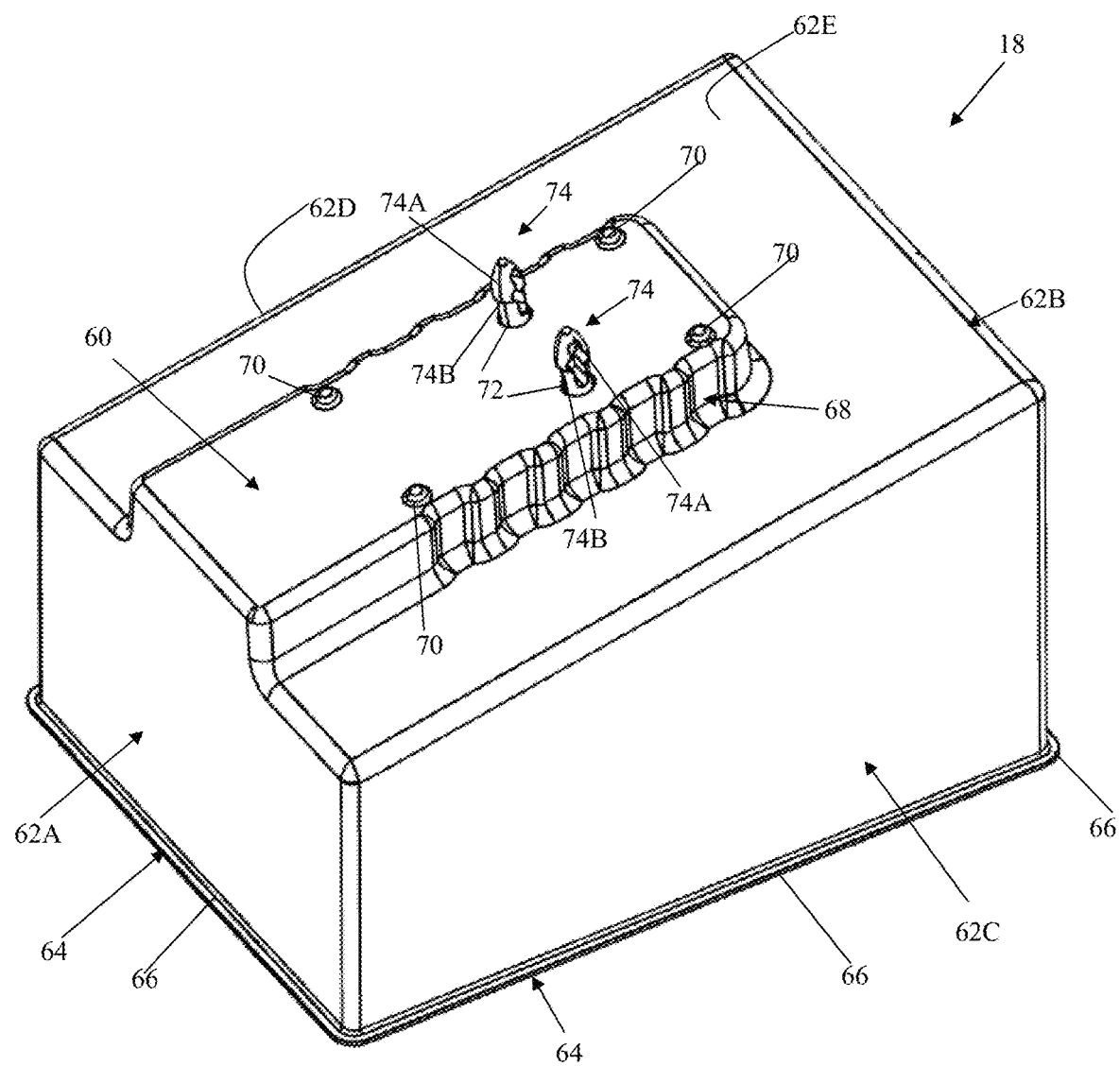
FIG. 5 is a perspective of an insert of the optical sight packaging of FIG. 1.

Referring now to FIGS. 3 and 5, the insert 18 includes a forward wall 62A, a rear wall 62B, a left wall 62C, a right wall 62D, and an upper portion 62E. The upper portion 62E defines the mount/bed 60. The insert 18 further comprises a peripheral flange 64 defining an upwardly facing shoulder 66 for reasons explained below. The upper portion 62E defines firearm imitation structure 68 intended to imitate a portion of a firearm on which the OSD is intended to be mounted. In the illustrated embodiment, the firearm imitation structure comprises imitation structure representing a rear portion of a slide of a handgun. The OSD includes openings 24 for receiving fasteners 22 for connecting the OSD to the firearm imitation structure (mount/bed). Examples of such connectors are described in further detail below with respect to FIGS. 7-18.

Now referring to FIGS. 3 and 6, the cover 14 will be described in further detail. In the illustrated embodiment, the cover 14 is made from a transparent material (broadly, "non-opaque" material) for reasons that will be explained below. The cover 14 can be made of plastic (e.g. acrylic) or another suitable material. The cover 14 includes a cover body 30 comprising a forward wall 38A, a rear wall 38B, a left wall 38C, a right wall 38D, and an upper portion 38E. The forward wall 38A is spaced a distance D from the lens of the optical sighting device. The distance D is shown as a relatively short distance, but the distance may vary. In the illustrated embodiment, the cover includes the hanger 32 and the hanger 32 is connected to the cover body. The hanger comprises a plastic hanger 32A defining a hanger opening through which a display rack could extend for displaying the packaging hanging from the rack. It will be understood other types of hangers could be used (e.g. a cord), and the hanger could be omitted, without departing from the scope of the present disclosure.

Figure 6:
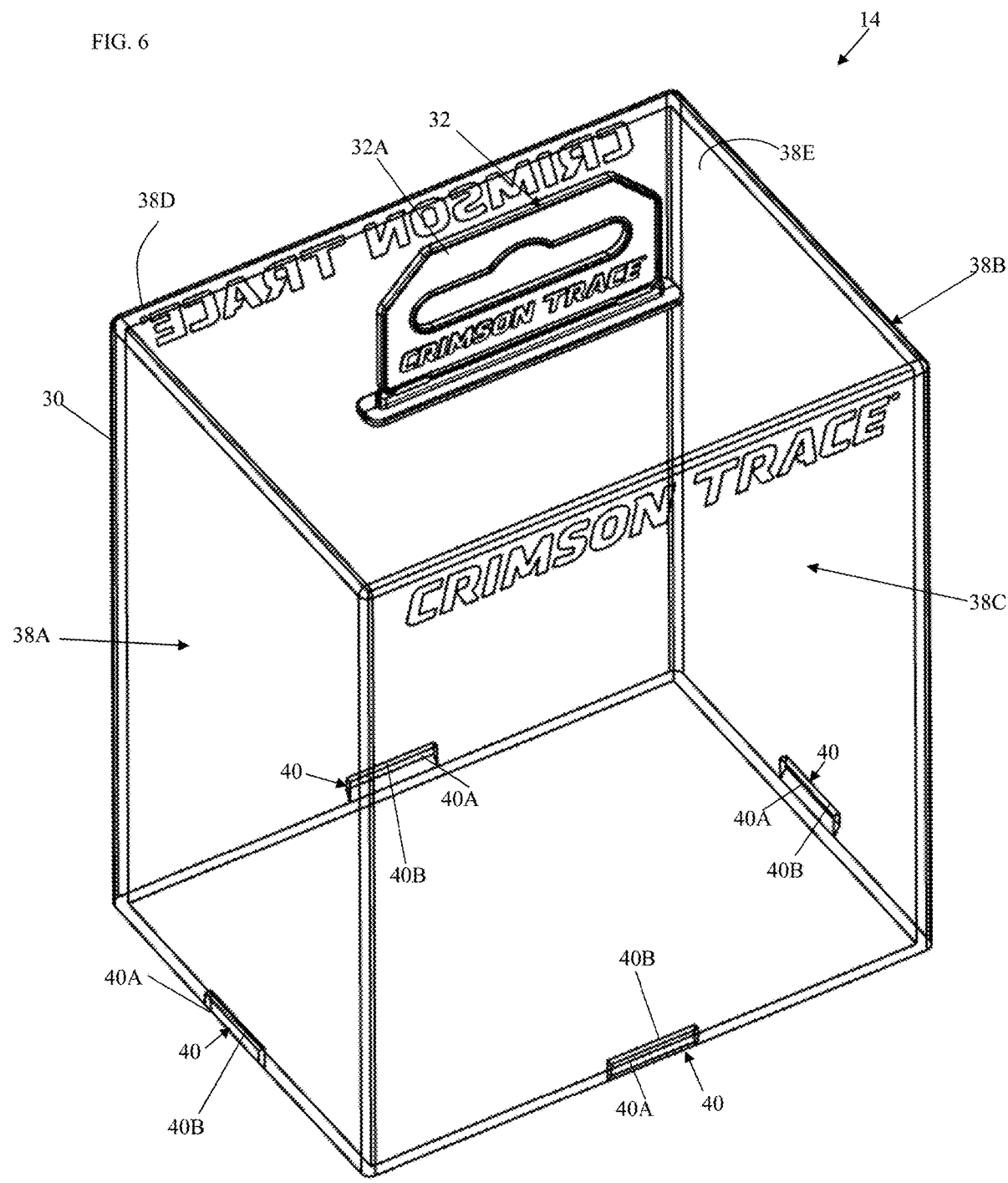
FIG. 6 is a perspective of a cover of the optical sight packaging.

As shown in FIG. 6, the cover 14 includes cover connectors 40. The cover connectors are connected to the cover body and serve to connect the cover to the base. In the illustrated embodiment, the cover connectors comprise lugs 40A that protrude laterally outward from the cover body. The lugs include upwardly facing retaining surfaces 40B that interact with the base to secure the cover to the base. Other configurations of cover connectors can be used, or the cover connectors can be omitted, without departing from the scope of the present disclosure.

It will be appreciated that the housing 16 and cover 14 can be referred to collectively as an enclosure 42 in which the optical sighting device 20 and insert 18 are received.

The cover connectors 40 connect to the housing connectors 52 to connect the cover to the housing. The cover connectors 40 are located on the cover body to be in registration with respective connectors 52 of the housing. The cover connectors 40 and housing connectors 52 are arranged to engage each other when the cover is installed into the housing. The arrangement is such that the connections of the lugs 40A and the housing openings 54 are formed automatically when the cover 14 is installed in the housing 16. In the illustrated embodiment, the connection is not releasable (semi-permanent) but can be disconnected by intentionally damaging the package to remove the OSD from the packaging after purchase. The upwardly facing retaining surfaces 40B of the cover connectors oppose the retaining lips 56 of the housing to obstruct upward movement of the cover relative to the housing. Absent tearing the housing to disconnect the cover from the housing (or some other destruction of the packaging), desirably the cover is not readily removable from the housing such that the connections are semi-permanent. It will be understood that other configurations of connectors and/or connections can be used without departing from the scope of this disclosure. For example, adhesive, tape, etc. could be used in addition to or instead of the cover and housing connectors.

In the illustrated embodiment, a bottom portion of the cover 14 engages the shoulder 66 of the insert 18 to locate the insert in the housing 16. The engagement of the cover and insert holds the insert in the housing.

It will be appreciated that "red dot" sights such as the illustrated OSD are configured to generate a reticle when the device is powered on. When the sight is in the packaging, the consumer may not have access to the sight to switch the sight on and/or a battery may not be installed. Accordingly, it is desirable to provide the imitation reticle indicator for the convenience of the person/purchaser who wants an understanding of the actual reticle of the OSD for later use after purchase. The person/purchaser simply holds the packaged OSD to their line of sight and looks through the rear wall and down the sighting axis SA to see the imitation of the sighting graphic of the OSD.

In the view of FIG. 3, the packaging is shown as including the imitation reticle indicator 36. In the illustrated embodiment, a sticker 34 carries the imitation reticle indicator 36. As will become apparent, the sticker is made from a transparent material (e.g. clear tape) to provide a clear view for the user when looking down the sighting axis SA of the OSD. It is understood that the OSD includes a reticle (broadly, sighting graphic and/or display graphic). The imitation reticle indicator 36 is representative of the reticle of the OSD in the packaging. Desirably, one or more of the size, shape, pattern, color, etc. of the imitation reticle indicator 36 is the same as the size, shape, pattern, color of the reticle of the OSD, when the OSD is outside of the enclosure, turned on, and in use. More desirably, the imitation reticle indicator is approximately to scale (e.g. +/−20%; +/−15%; +/−10%) of the size of the reticle of the OSD. It will be understood that the imitation reticle indicator may change in accordance with the sighting graphic provided by the OSD housed in the packaging. Moreover, the imitation reticle indicator may be omitted (e.g., if the actual reticle is visible, or if the OSD does not include a reticle).

In the illustrated embodiment, the sticker 34 is adhered to the forward wall 38A of the cover so the imitation reticle indicator 34 is intersected by the sighting axis SA. In another embodiment, the sticker may be adhered directly to a lens of the OSD to intersect the sighting axis SA. Configurations other than the sticker can be used without departing from the scope of this disclosure. For example, the imitation reticle indicator may be printed on the cover.

Although the red dot sight includes a relatively simple reticle (e.g., red dot), it will be understood that other optical sighting devices can include more complex reticles or reticles having other configurations (e.g., cross hairs and/or other sighting graphics), or no reticle, without departing from the scope of the present disclosure.

In the illustrated embodiment, the bottom wall 50A of the housing includes a removable portion (panel) 58. For example, the removable portion could be breakable away from the remainder of the bottom wall 50A (e.g., frangible connection, perforation, scoring, etc.). When the removable portion 58 is removed, the bottom wall 50A defines an opening 58A which provides an access point for the person to continue to remove the bottom wall, and thus the insert from the housing. In another embodiment, the bottom wall 50A may define an opening sized and shaped for the person to insert a finger to begin disassembling the packaging. Other configurations of providing an access point to begin opening the package (e.g. pull-tab) are not outside the scope of this disclosure.

Referring to FIGS. 1, 2, 3 and 5, the mount is sized and shaped to imitate firearm imitation structure, as described above. With reference to FIGS. 3 and 5, the mount includes a plurality of fingers 70 and includes a plurality of recesses 72 for receiving a plurality Christmas-tree connectors 74, respectively. Each Christmas-tree connector 74 includes an upper portion comprising a resiliently deformable cone 74A including a rib 74B. The OSD connector comprises corresponding openings 24 configured to receive the respective Christmas-tree connectors 74. When securing the OSD to the mount, the Christmas-tree connectors 74 pass through the respective recesses 72 of the mount 60. The openings of the OSD are aligned with and pushed over the Christmas-tree connectors such that the ribs 74B temporarily deform until passing through the openings 24 and return to a non-deformed state, as seen in FIG. 3. The fingers 70 assist in preventing the OSD from moving while mounted on the mount. In the illustrated embodiment, the firearm structure of mount is formed integrally with the insert 18. In other embodiments, such as described below, the firearm structure may be formed separately and connected to the mount. Other types of connectors (e.g., having configurations different from the Christmas-tree connectors) can be used, other numbers of connectors can be used, and the connectors can be omitted without departing from the scope of the present disclosure.

Figure 7:
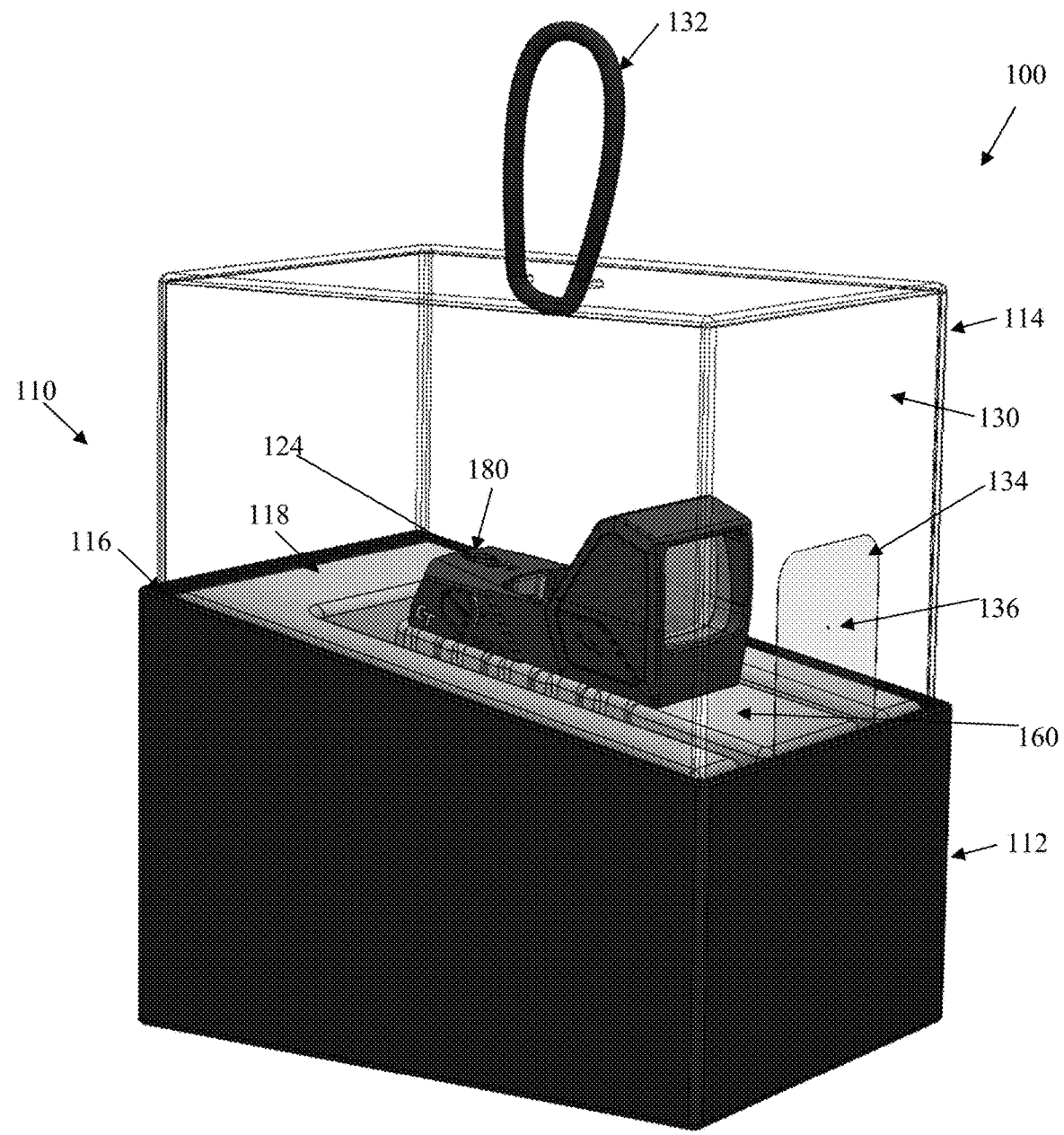
FIG. 7 is a perspective of a second embodiment of optical sight packaging and an optical sight.
Figure 8:
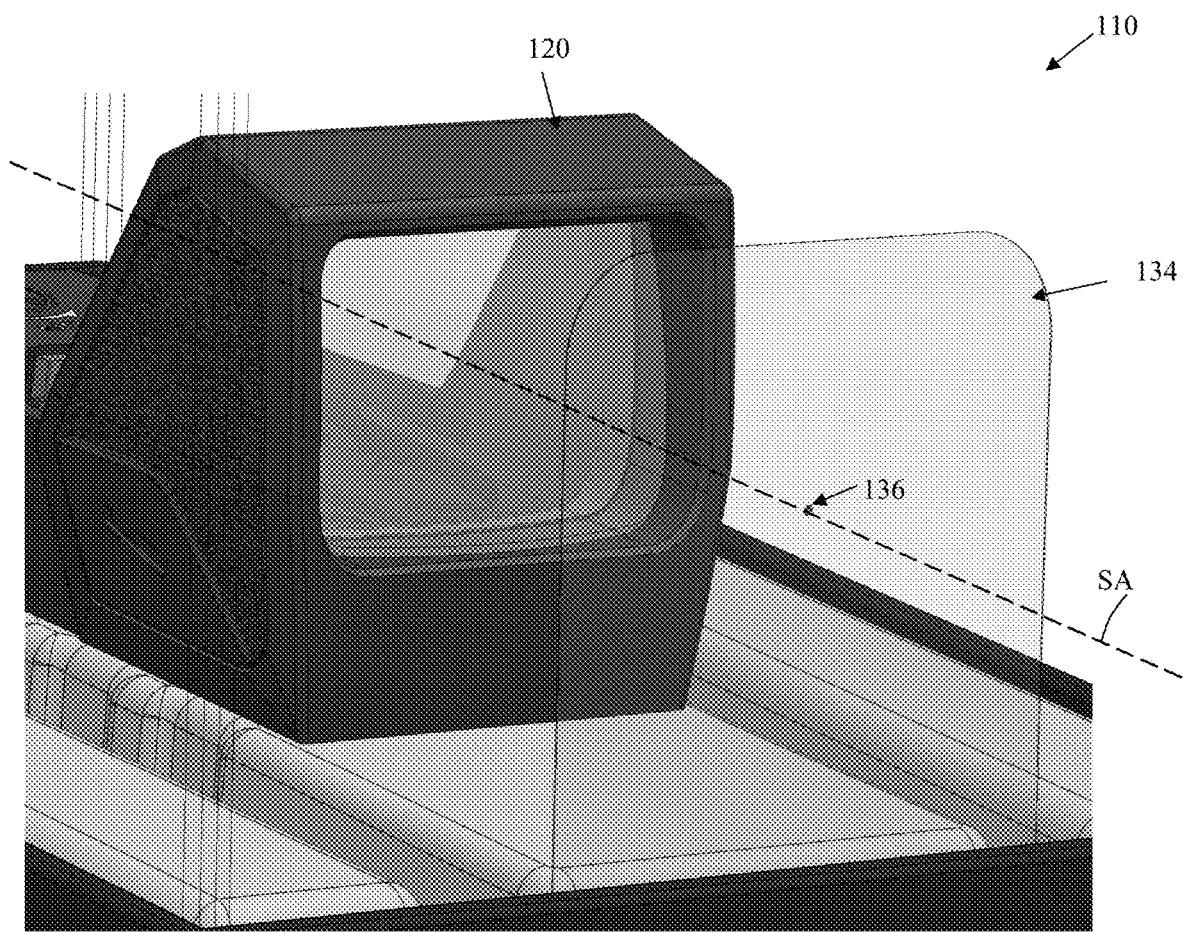
FIG. 8 is an enlarged fragmentary front perspective of the optical sight packaging and optical sight of FIG. 7.
Figure 9:
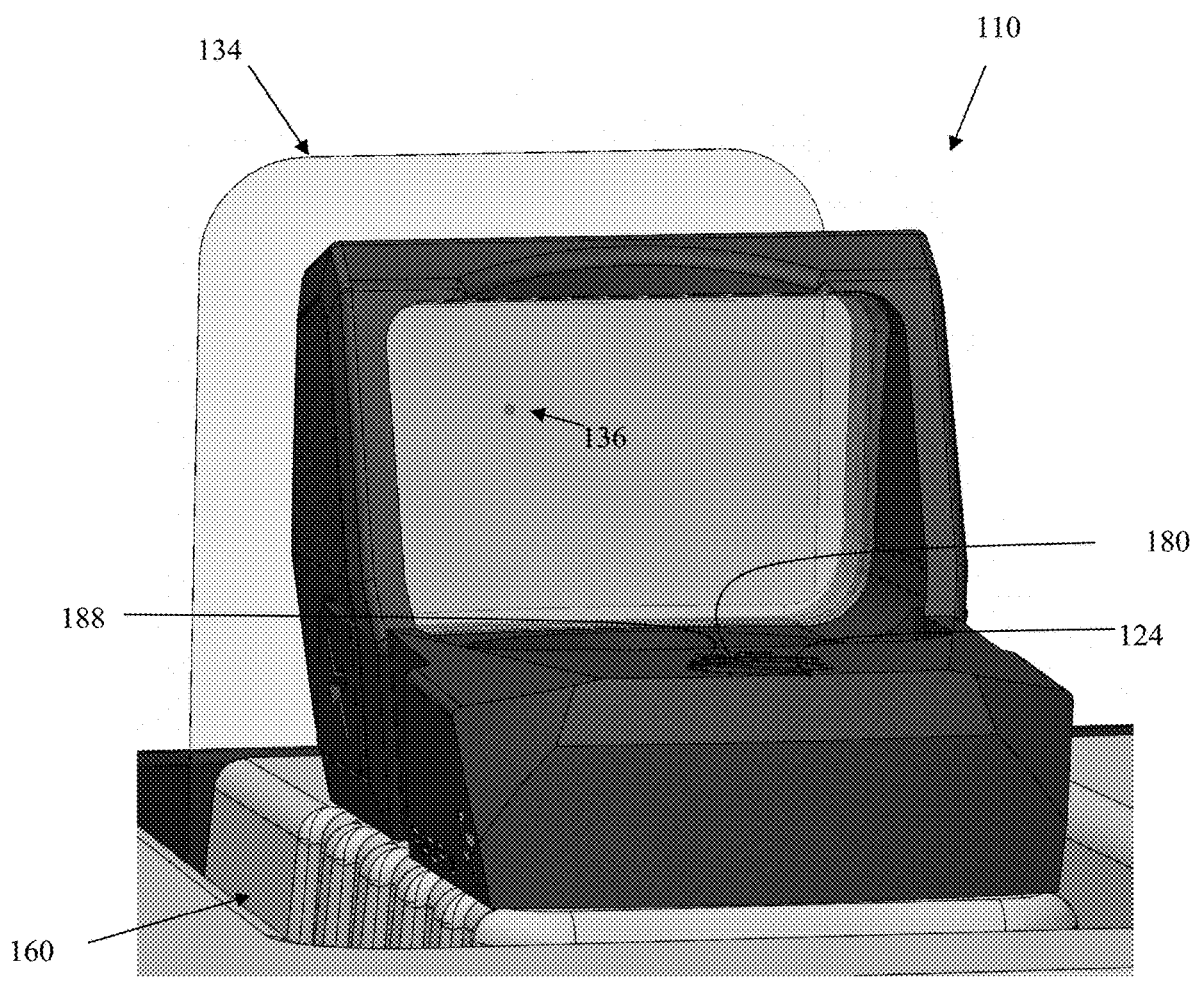
FIG. 9 is an enlarged fragmentary rear perspective of the optical sight packaging and optical sight of FIG. 7.
Figure 10:
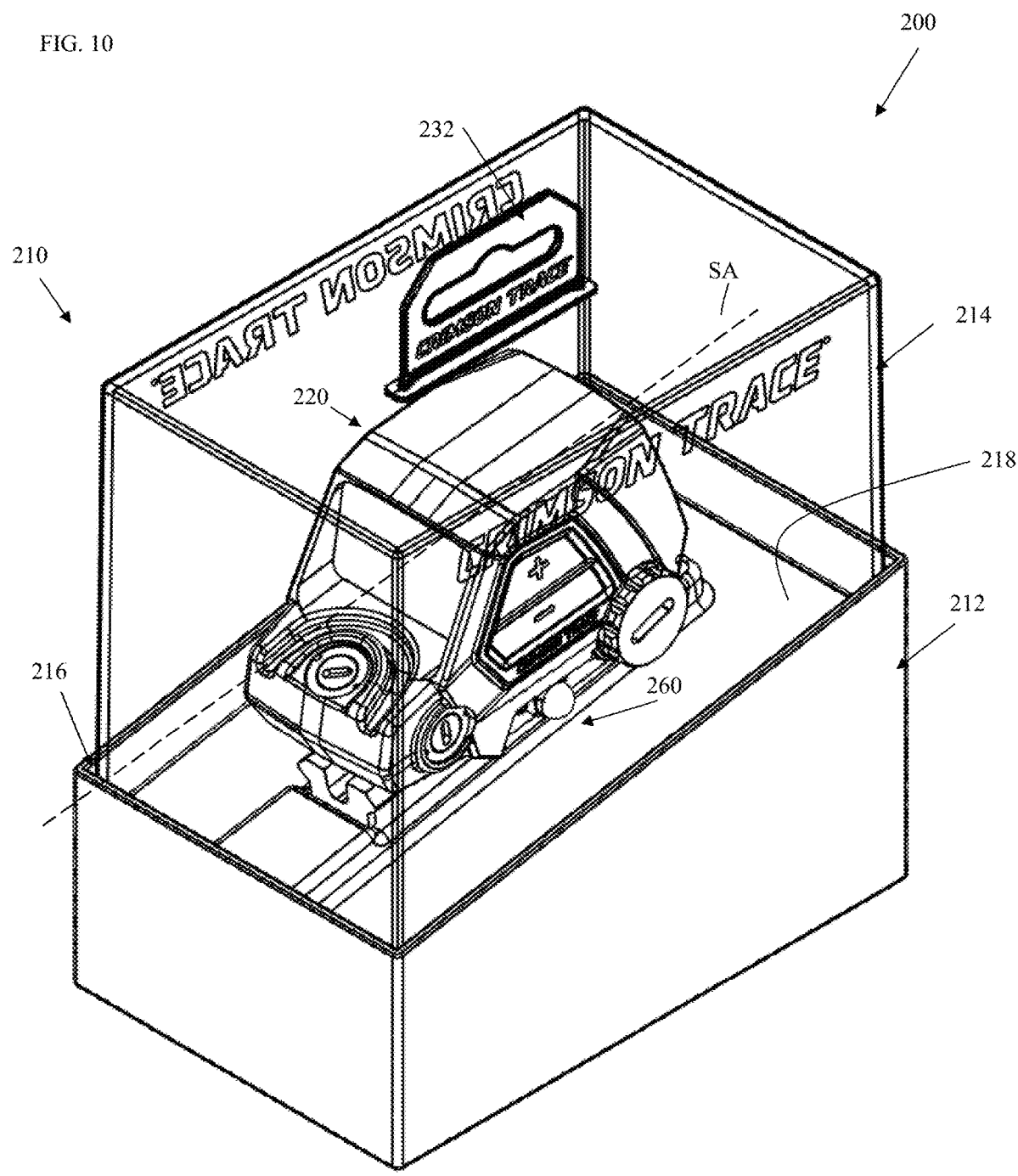
FIG. 10 is a perspective of a third embodiment of optical sight packaging of the present disclosure and an optical sight.
Figure 11:
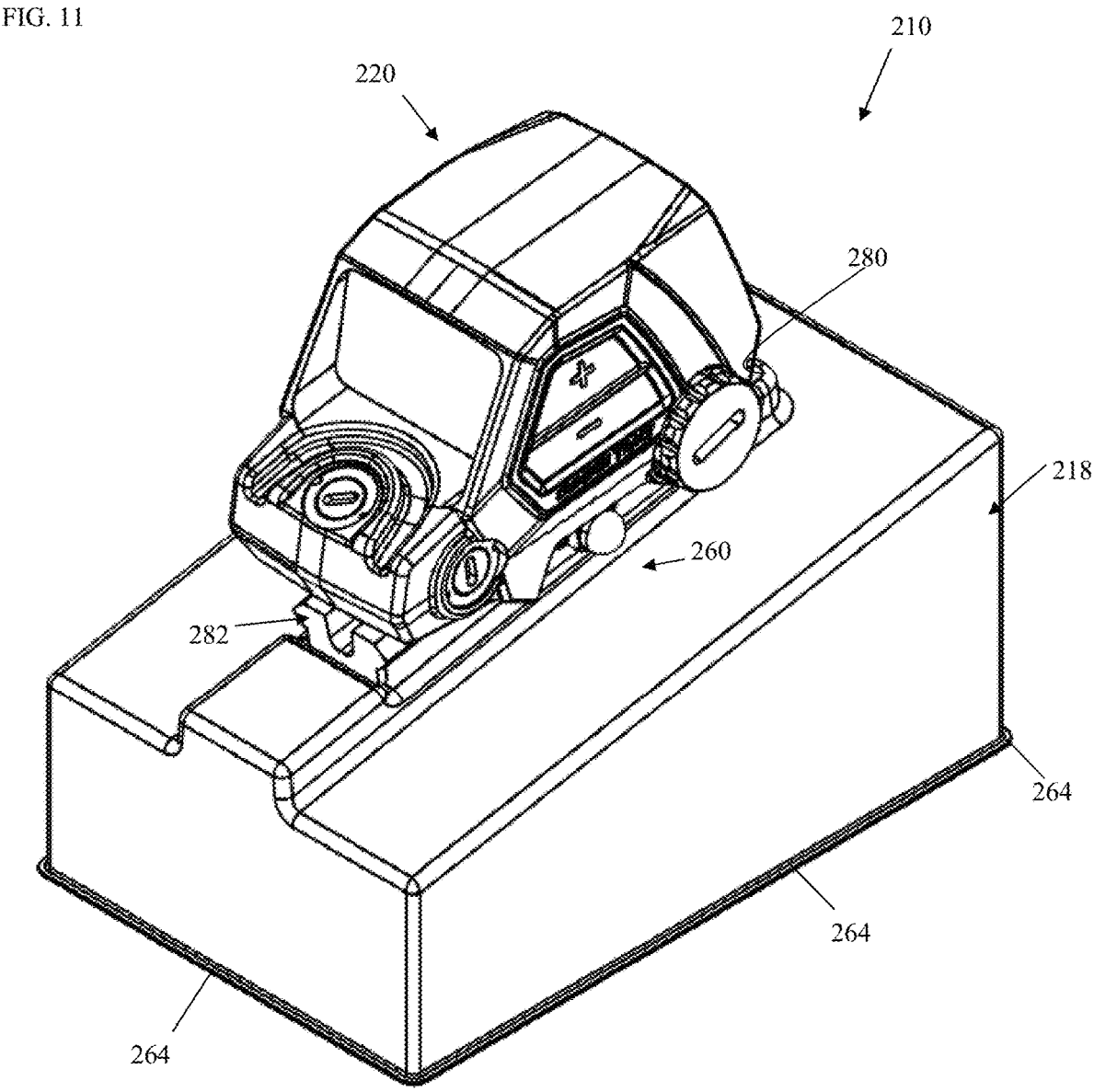
FIG. 11 is a perspective of the optical sight and an insert of the optical sight packaging of FIG. 10.
Figure 12:
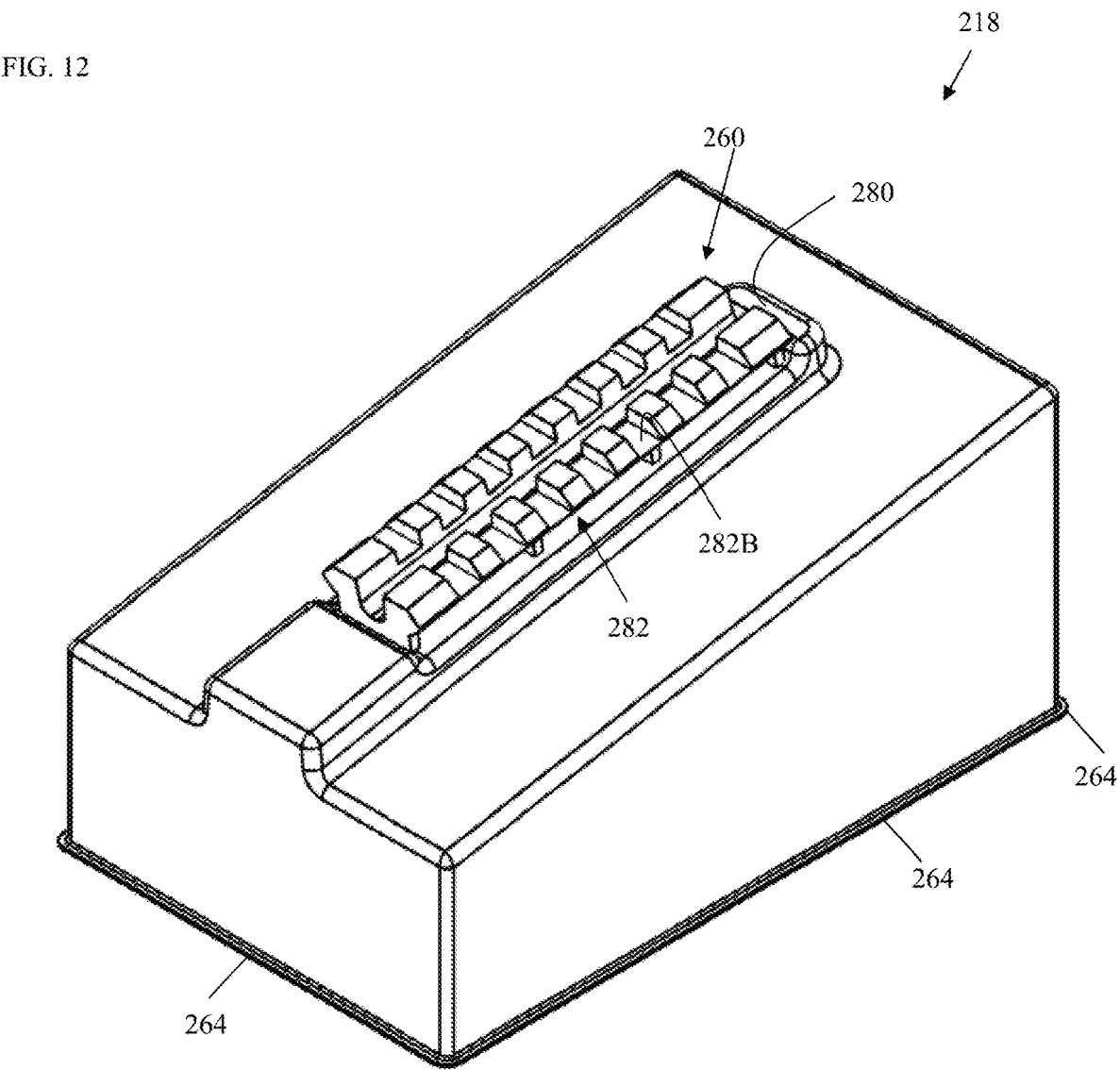
FIG. 12 is a perspective of the insert of the sight packaging of FIG. 10.
Figure 13:
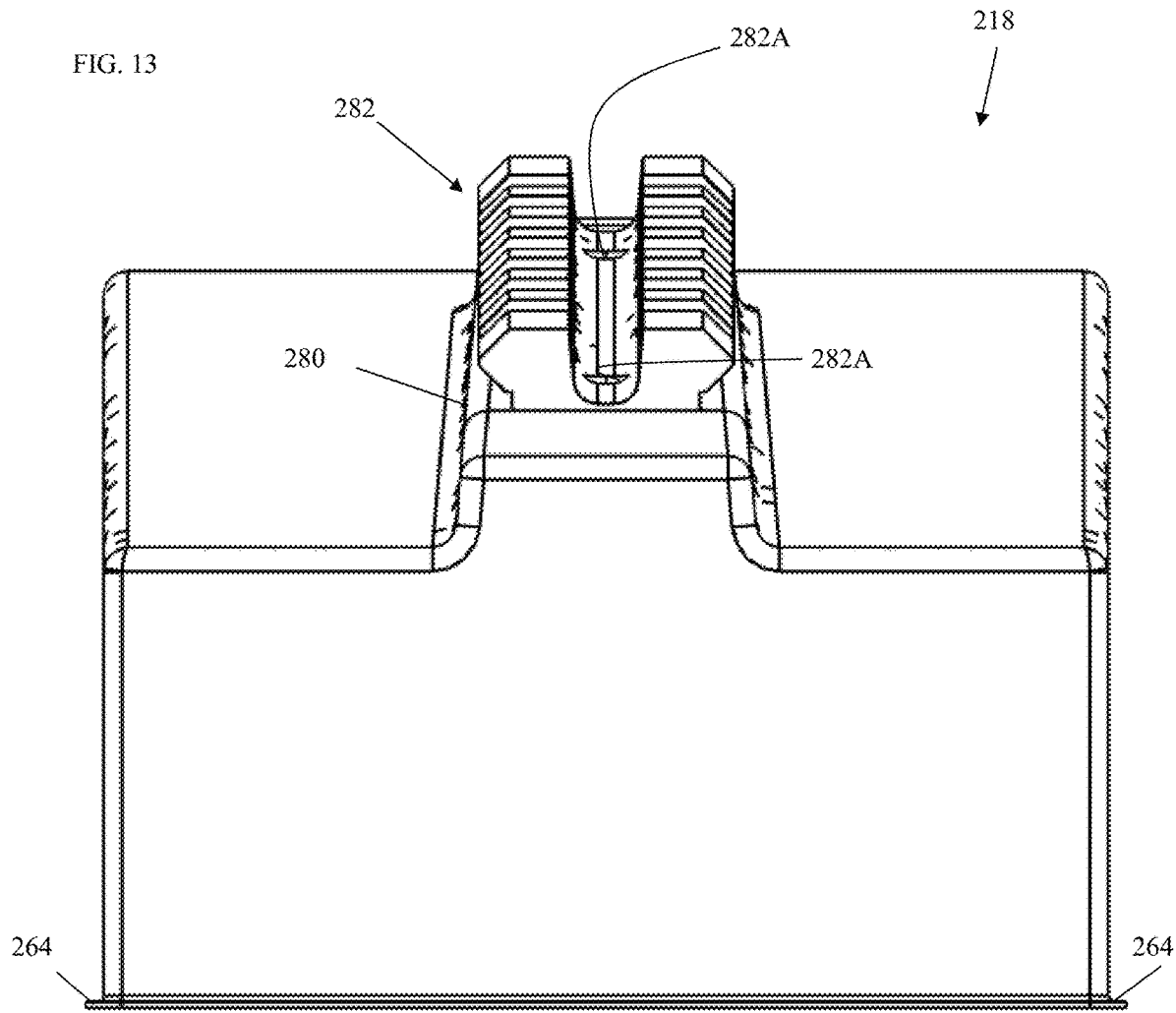
FIG. 13 is a rear elevation of the insert of FIG. 12.

Referring to FIGS. 7-9, a second embodiment of the present disclosure is generally indicated by 100. The packaging of this embodiment is similar to the packaging 10 of the prior embodiment, and like features are indicated by like reference numbers, plus 100. For example, the packaging 110 includes a base 112, a cover 114, and an optional hanger 132, and an optional sticker 134. The base 112 comprises a housing 116 and an insert 118. The housing 116 receives the insert 118, and the insert defines a mount 160.

In this embodiment, the OSD is secured to the mount using a screw 180 and a nut. The screw and nut connection may be more desirable for heavier optical sighting devices (e.g. binoculars). The OSD includes a body that defines a threaded opening 124 and the mount defines a body that defines a recess 188. The threaded opening 124 and the recess 188 are arranged to overlie each other and receive the screw 180. Referring to FIGS. 7 and 9, the head of the screw is configured to lie flush with the body of the OSD while the threaded portion protrudes into the housing, where the nut is fastened to the screw. The person may use a tool (e.g. screwdriver) to loosen the screw and the nut to remove the OSD from the mount. In the illustrated embodiment, the mount is sized and shaped to include firearm structure that is representative of the rear portion of a firearm (e.g. a slide of a handgun) to which the OSD will be mounted. Other non-firearm structure configurations (e.g. a flat mount) are not outside the scope of this disclosure.

Referring to FIGS. 10-15, a third embodiment of the present disclosure is generally indicated by 200 for an optical sight 220 having a sighting axis SA. The packaging of this embodiment is similar to the packaging 10 of the prior embodiment, and like features are indicated by like reference numbers, plus 200. For example, the packaging 210 includes a base 212, a cover 214, and an optional hanger 232. A reticle imitation sticker is absent in this embodiment, but it is understood one could be provided. The base 212 comprises a housing 216 and an insert 218 having flanges 264. The housing 216 receives the insert 218, and the insert 218 defines a mount 260.

In this embodiment, the dovetail rail 282 is formed separately from the insert 218 and secured to the insert. The rail 282 includes recesses 282A and slots 282B. Fasteners, such as screws, Christmas-tree type connectors, zip ties, etc., may be fed through the recesses 282A thereby securing the dovetail rail to the mount 260. For example, in one embodiment, a zip tie can be looped through the recesses 282A and extend along the longitudinal slot in which the recesses 282A are located and through the interior of the insert 218 to secure the rail to the insert.

Figure 14:
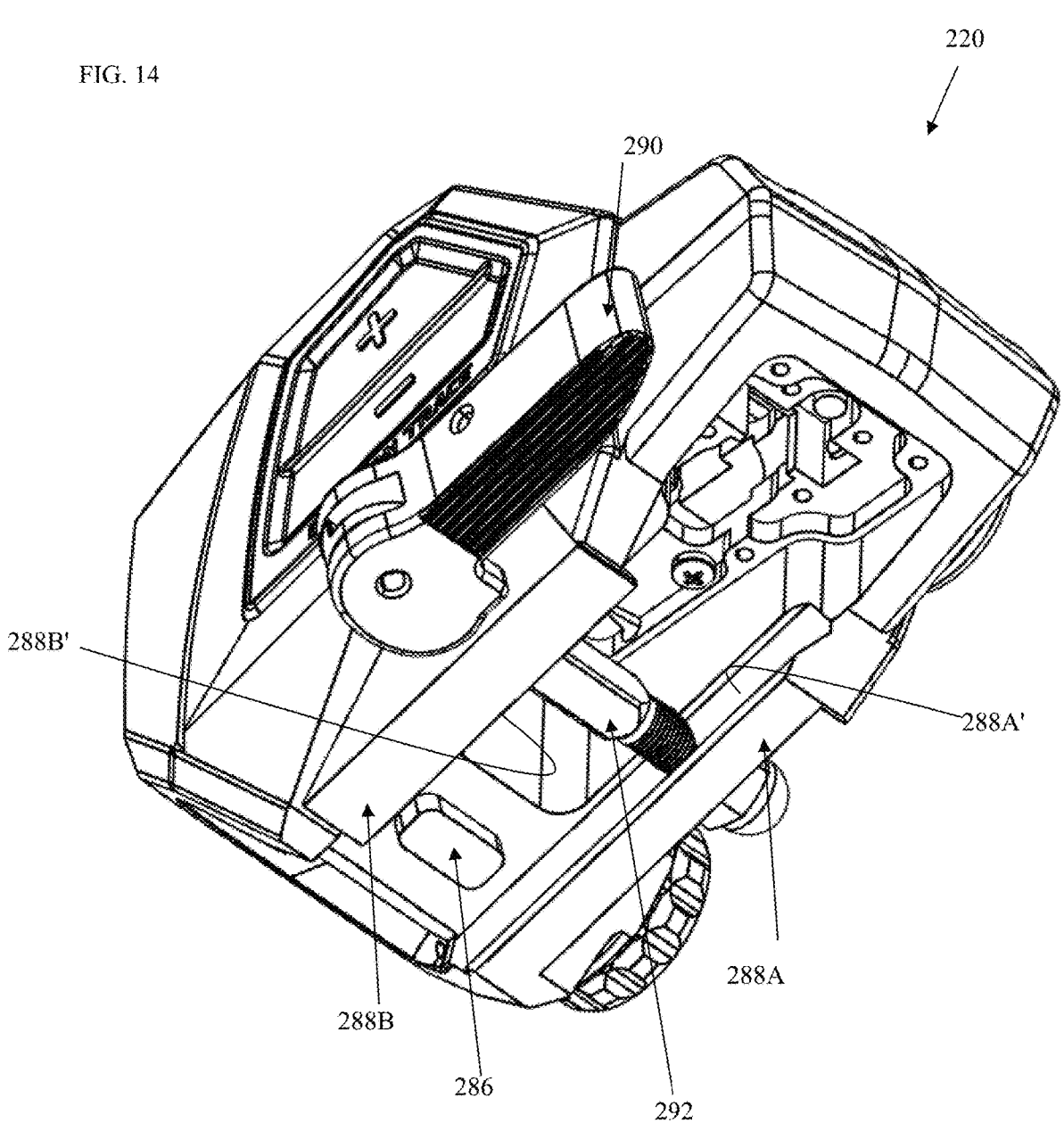
FIG. 14 is a bottom perspective of the optical sight of FIG. 10.
Figure 15:
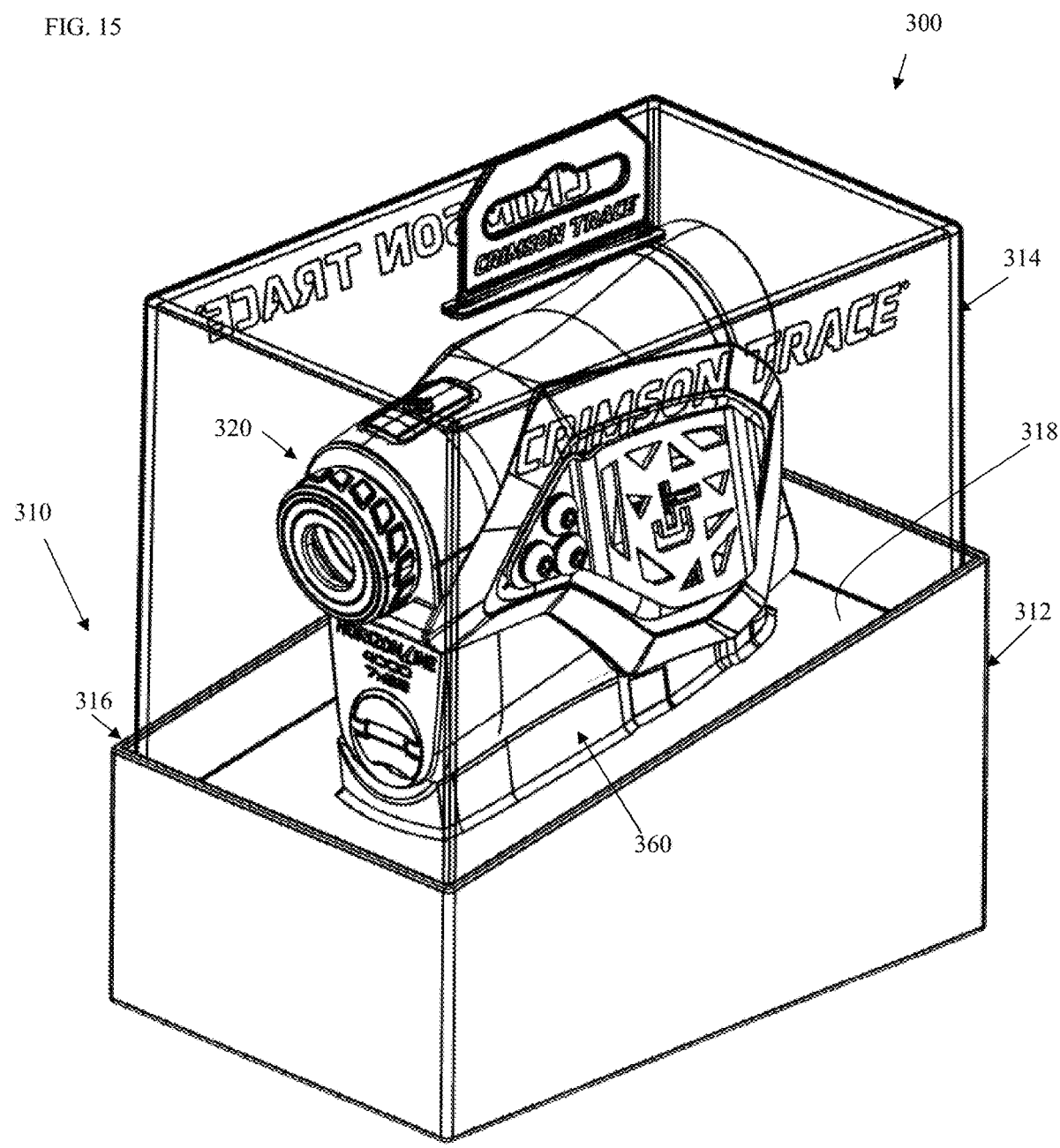
FIG. 15 is a perspective of a fourth embodiment of optical sight packaging and an optical sight.
Figure 16:
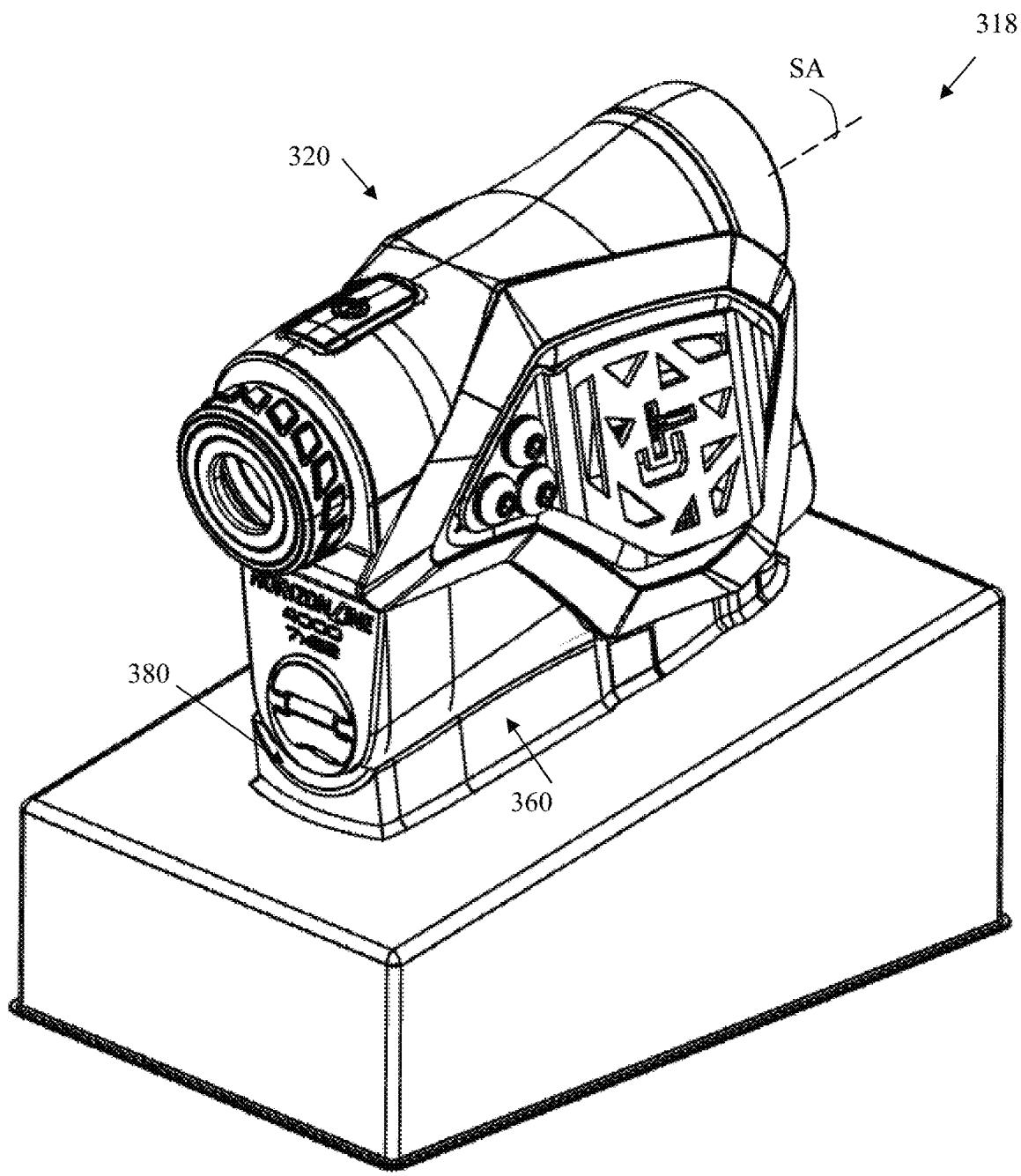
FIG. 16 is a perspective of the optical sight and an insert of the optical sight packaging of FIG. 15.

Referring the FIG. 14, the OSD connector comprises connection structure configured to connect to the dove tail rail. The bottom of the OSD includes a lug 286, moveable first and second jaws 288A, 288B, a cam latch 290, and a pin 292 connected to the cam latch 290. The cam latch 290 is configurable between open (loosened) and a closed (tightened) positions for mounting the OSD to the dovetail rail 282. In the illustrated embodiment, each jaw 288A, 288B is sized and shaped with grooves 288A', 288B' to correspond with the size and shape of the dovetail rail 282. The first jaw 288A is fixed, and the second jaw 288B is moveable with respect to the first jaw 288A. To secure the OSD to the dovetail rail 282, the cam latch is in the open position so that the jaws 288A, 288B can be slid over and/or placed on top of the dovetail rail 282. The lug 286 fits within a slot to prevent longitudinal movement of the OSD with respect to the dovetail rail. The pin 292 is arranged through another slot of the dovetail rail to further prevent longitudinal movement of the OSD with respect to the dovetail rail. The cam latch 290 is then moved to the closed position, thereby clamping the jaws 288A, 288B onto the dovetail rail 282 and to prevent lateral movement of the OSD with respect to the dovetail rail 282. Other configurations of connecting the dove tail rail to the mount (e.g. nuts and bolts, adhesive, or a composite structure, etc.) and other configurations of the jaws (e.g. both fixed and/or both moveable with respect to each other) are not outside the scope of this disclosure.

Referring to FIGS. 15-18, a fourth embodiment of the present disclosure is generally indicated by 300. The packaging of this embodiment is similar to the packaging 10, and like features are indicated by like reference numbers, plus 300. For example, the packaging 310 includes a base 312, a cover 314, and an optional hanger 332. An optional sticker is absent in this embodiment, but it is understood one could be provided. The base 312 comprises a housing 316 and an insert 318. The housing 316 receives the insert 318, and the insert defines a mount 360.

Figure 17:
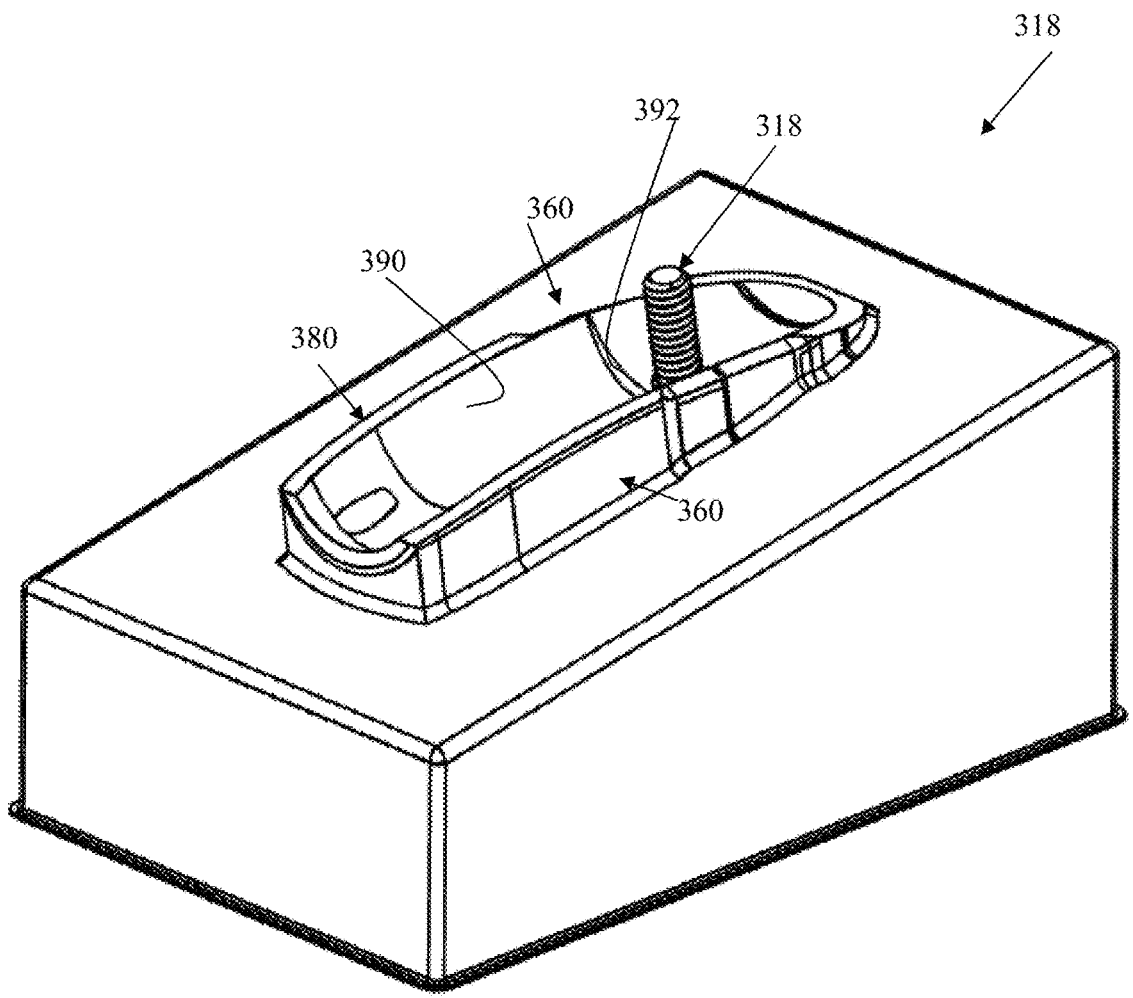
FIG. 17 is a perspective of the insert.
Figure 18:
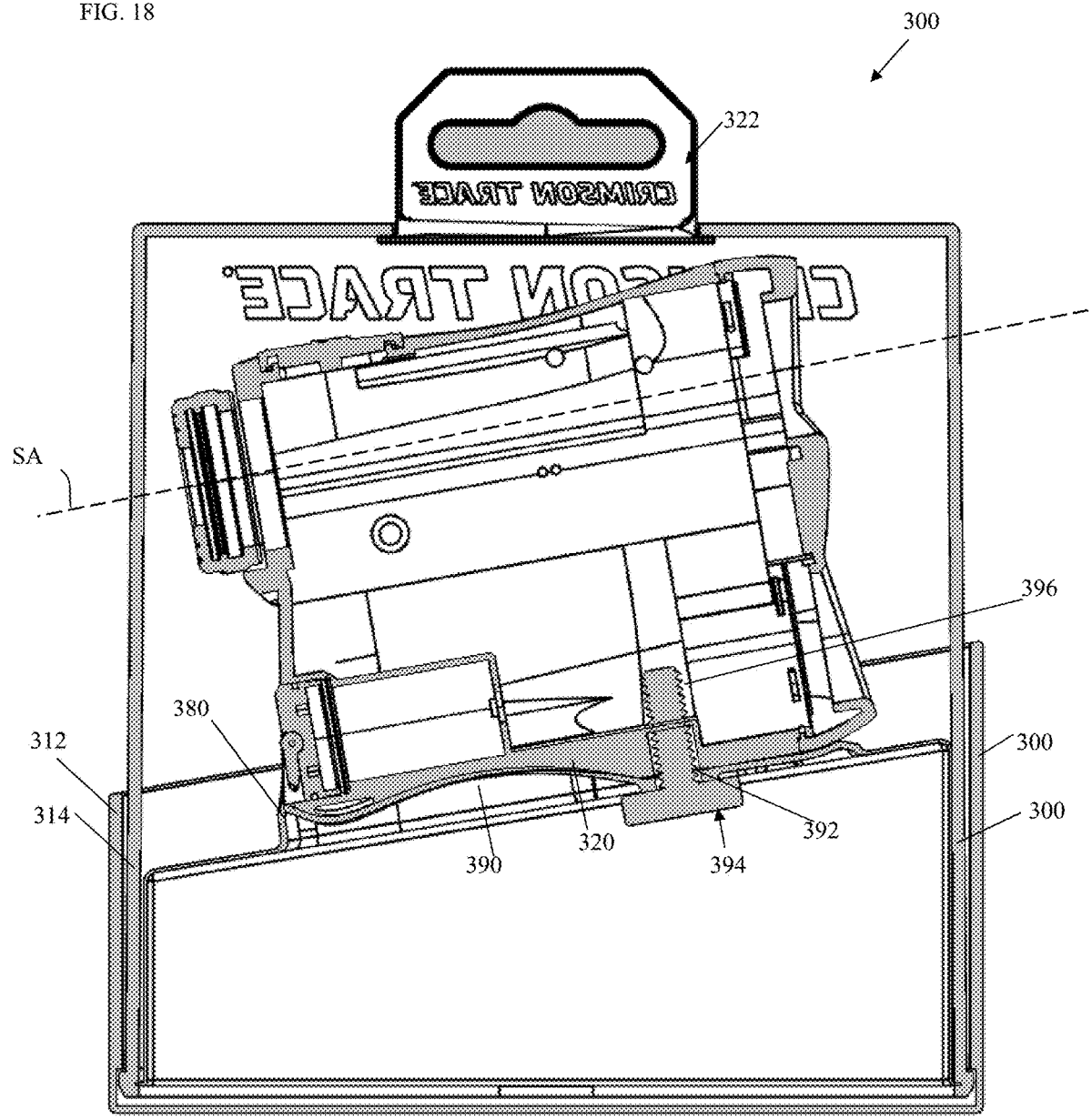
FIG. 18 is a cross-section of the optical sight packaging of FIG. 15.

In this embodiment, the OSD comprises a range finder 320. The range finder 320 includes a reticle used to aim the range finder at a target to be ranged, and the range finder is configured to determine a distance to the target. Referring to FIGS. 17 and 18, the mount 360 includes a bed 380 having a sloped surface 390 and a recess 392 for receiving a ¼"-20 bolt (394) (broadly, fastener). The range finder 320 includes a bottom surface 320B that defines a threaded opening 396 to register with the recess 392 of the mount. The sloped surface 390 of the bed 380 is sized and shaped to correspond with the size and shape of the bottom surface 320B of the range finder. To secure the rangefinder to the mount 360, the bottom surface of the range finder is placed into the bed 380. The ¼"-20 bolt is then pushed and/or threaded through the recess 392 of the bed 380 and threaded into the threaded opening 396 of the range finder, thereby securing the range finder to the mount 360, as seen in FIG. 18. In the illustrated embodiment, the mount 360 is formed integrally with the insert 318 (FIG. 17), however other configurations are not outside the scope of this disclosure. The ¼"-20 bolt may be substituted for a fastener that corresponds to the thread and or opening of the range finder in the packaging, without departing from the scope of this disclosure.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A packaged optical sighting device assembly comprising:
   an optical sighting device having a sighting axis along which a user looks to use the optical sighting device; and
   a package defining an interior in which the optical sighting device is located, the package including:
      a base comprising an optical sighting device mount to which the optical sighting device is connected;
      a cover at least partially bounding the interior, the cover being configured to permit the user to view the optical sighting device through the cover and to look through the optical sighting device along the sighting axis;
      wherein the base includes a base connector and the cover includes a cover connector, the base connector and cover connector being located with respect to each other to form a retaining connection, at least one of the cover connector or the base connector comprising a lug, the other of the at least one of the cover connector or the base connector comprising a lip, the retaining connection configured to be formed by movement of the cover in a first direction with respect to the base in which the cover is brought into engagement with the base and the lug and lip are brought into retaining relationship with each other, in the retaining connection the lip being arranged to obstruct movement of the lug in a second direction opposite the first direction to resist disconnection of the cover from the base, the base further comprising a housing and an insert formed separately from the housing, the insert comprising the optical sighting device mount.

2. The packaged optical sighting device assembly of claim 1, wherein the cover comprises a forward portion bounding a forward part of the interior and a rear portion bounding a rear part of the interior, the forward and rear portions being configured to permit the user to look through the forward and rear portions to look through the cover and through the optical sighting device along the sighting axis.

3. The packaged optical sighting device assembly of claim 2, wherein the forward and rear portions of the cover are transparent.

4. The packaged optical sighting device assembly of claim 3, wherein the cover includes a forward wall and a rear wall, the forward wall including the forward portion, the rear wall including the rear portion, the forward wall being transparent, and the rear wall being transparent.

5. The packaged optical sighting device assembly of claim 1, wherein the optical sighting device mount comprises a bed configured to support the optical sighting device.

6. The packaged optical sighting device assembly of claim 5, wherein the bed comprises imitation firearm structure shaped to imitate a portion of a firearm.

7. The packaged optical sighting device assembly of claim 6, wherein the imitation firearm structure is shaped to define an imitation rear portion of a slide of a pistol.

8. The packaged optical sighting device assembly of claim 6, wherein the imitation firearm structure comprises a dovetail rail.

9. The packaged optical sighting device assembly of claim 1, wherein the optical sighting device mount comprises a dovetail rail.

10. The packaged optical sighting device assembly of claim 1, wherein the package includes a package body and the optical sighting device mount is formed separately from and connected to package body.

11. The packaged optical sighting device assembly of claim 10, wherein the optical sighting device mount includes a dovetail rail.

12. The packaged optical sighting device assembly of claim 1, wherein the cover and base are configured to automatically form a semi-permanent connection of the cover and base when the cover is installed on the base.

13. The packaged optical sighting device assembly of claim 1, wherein the lug and lip are configured to automatically form the retaining connection when the cover is installed on the base.

14. The packaged optical sighting device assembly of claim 1, wherein the insert comprises a shoulder configured to engage the cover to locate the insert relative to the housing.

15. The packaged optical sighting device assembly of claim 1, wherein the optical sighting device comprises a range finder.

16. The packaged optical sighting device assembly of claim 1, wherein the optical sighting device comprises a weapon sight.

17. The packaged optical sighting device assembly of claim 16, wherein the optical sighting device is switchable between a powered off state and a powered on state, the optical sighting device configured to generate a reticle when in the powered on state, and the optical sighting device configured to not generate the reticle when in the powered off state.

18. The packaged optical sighting device assembly of claim 1, wherein the cover includes a lower portion including first and second side wall segments coupled at a corner nested in a corner of the base.

19. The packaged optical sighting device assembly of claim 1, wherein the retaining connection is configured to prevent non-destructive removal of the base from the cover.

20. A packaged optical sighting device assembly comprising:
   an optical sighting device having a sighting axis along which a user looks to use the optical sighting device; and
   a package defining an interior in which the optical sighting device is located, the package including:
      a base comprising an optical sighting device mount to which the optical sighting device is connected;
      a cover at least partially bounding the interior, the cover being configured to permit the user to view the optical sighting device through the cover and to look through the optical sighting device along the sighting axis;
      wherein the base includes a base connector and the cover includes a cover connector, the base connector and cover connector being located with respect to each other to form a retaining connection, at least one of the cover connector or the base connector comprising a lug, the other of the at least one of the cover connector or the base connector comprising a lip, the retaining connection configured to be formed by movement of the cover in a first direction with respect to the base in which the cover is brought into engagement with the base and the lug and lip are brought into retaining relationship with each other, in the retaining connection the lip being arranged to obstruct movement of the lug in a second direction opposite the first direction to resist disconnection of the cover from the base, the optical sighting device mount comprising a bed configured to support the optical sighting device, wherein the bed comprises at least one opening receiving a fastener to connect the optical sighting device to the optical sighting device mount.

21. A packaged optical sighting device assembly comprising:
   an optical sighting device having a sighting axis along which a user looks to use the optical sighting device; and
   a package defining an interior in which the optical sighting device is located, the package including:
      a base comprising an optical sighting device mount to which the optical sighting device is connected;
      a cover at least partially bounding the interior, the cover being configured to permit the user to view the optical sighting device through the cover and to look through the optical sighting device along the sighting axis;
   wherein the base includes a base connector and the cover includes a cover connector, the base connector and cover connector being located with respect to each other to form a retaining connection, at least one of the cover connector or the base connector comprising a lug, the other of the at least one of the cover connector or the base connector comprising a lip, the retaining connection configured to be formed by movement of the cover in a first direction with respect to the base in which the cover is brought into engagement with the base and the lug and lip are brought into retaining relationship with each other, in the retaining connection the lip being arranged to obstruct movement of the lug in a second direction opposite the first direction to resist disconnection of the cover from the base, wherein the base comprises a housing and an insert, the insert sized and shaped to fit in the housing, the insert including the optical sighting device mount, the cover configured to engage the insert when the cover is connected to the base to locate the insert in the housing.

* * * * *